(12) United States Patent
MacManus

(10) Patent No.: US 7,905,027 B2
(45) Date of Patent: Mar. 15, 2011

(54) METHOD AND APPARATUS FOR PROBE TIP DIAMETER CALIBRATION

(75) Inventor: Richard MacManus, Narragansett, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 19 days.

(21) Appl. No.: 12/496,469

(22) Filed: Jul. 1, 2009

(65) Prior Publication Data

US 2011/0000277 A1  Jan. 6, 2011

(51) Int. Cl.
*G01B 21/00* (2006.01)
(52) U.S. Cl. .............................. 33/502; 73/1.79
(58) Field of Classification Search ................ 33/502; 73/1.79
See application file for complete search history.

(56) References Cited

U.S. PATENT DOCUMENTS

| | | | |
|---|---|---|---|
| 4,962,591 A * | 10/1990 | Zeller et al. ................. | 33/502 |
| 5,253,428 A | 10/1993 | McMurtry | |
| 5,657,549 A | 8/1997 | Shen et al. | |
| 6,178,389 B1 * | 1/2001 | Sola et al. ...................... | 702/152 |
| 6,493,956 B1 * | 12/2002 | Matsuda ........................ | 33/502 |
| 6,513,253 B2 * | 2/2003 | Matsuda et al. ................ | 33/502 |
| 6,640,607 B2 * | 11/2003 | Abbe ............................. | 73/1.01 |
| 6,668,466 B1 * | 12/2003 | Bieg et al. ...................... | 33/503 |
| 6,701,267 B2 | 3/2004 | Noda et al. | |
| 6,748,790 B2 * | 6/2004 | Abbe ............................. | 73/1.79 |
| 7,055,367 B2 * | 6/2006 | Hajdukiewicz et al. ........ | 73/1.79 |
| 7,543,393 B2 * | 6/2009 | McMurtry et al. ............. | 33/502 |
| 2004/0244664 A1 | 12/2004 | Hajdukiewicz et al. | |
| 2005/0005465 A1 | 1/2005 | Taylor et al. | |
| 2007/0138374 A1 | 6/2007 | Nishibashi et al. | |
| 2007/0144022 A1 | 6/2007 | MacManus et al. | |
| 2008/0249737 A1 | 10/2008 | Jordil et al. | |
| 2009/0090013 A1 | 4/2009 | Hicks | |
| 2010/0018069 A1 * | 1/2010 | Ould et al. ..................... | 33/503 |
| 2010/0206040 A1 * | 8/2010 | Ebara ............................ | 73/1.79 |

OTHER PUBLICATIONS

International Search Report dated Sep. 1, 2010 from corresponding WO application.
Written Opinion dated Sep. 1, 2010 from corresponding WO application.

* cited by examiner

*Primary Examiner* — Christopher W Fulton
(74) *Attorney, Agent, or Firm* — Wolf, Greenfield & Sacks, P.C.

(57) ABSTRACT

A method for determining probe tip diameters with improved accuracy and reliability that includes performing a routine for determining probe tip diameter multiple times with the arm of the coordinate measurement machine in different machine positions. Diameter values associated with each of the calibration routines may be combined in a manner that provides more accurate diameter measurements.

23 Claims, 6 Drawing Sheets

METHOD AND APPARATUS FOR PROBE TIP DIAMETER CALIBRATION

BACKGROUND

1. Field of Invention

The invention relates generally to coordinate measuring machines, and more specifically to methods and apparatuses for calibrating a probe tip of a coordinate measuring machine.

2. Discussion of Related Art

Coordinate measuring machines (CMM's) are in common use for dimensional inspection of workpieces. Typically, a workpiece is secured to a table, and a probe, such as one using a touch sensor, is moved in three dimensions on an arm of the CMM within a measurement volume to contact the workpiece at various points. When the probe contacts the workpiece, measuring scales in the x, y and z directions are read to obtain the position coordinates of the contacted point on the workpiece. By contacting various points on the workpiece, measurements of workpiece features can be obtained.

Probe assemblies used by CMM's often include an elongated probe shaft that is mounted to the arm of a CMM at a first end, and a spherical probe tip positioned at a second end of the probe shaft. The elongated shape of the probe shaft allows the probe tip to access recesses and difficult to reach areas of a workpiece. The probe shaft is often mounted to the CMM arm at one of several different angles, which allows the probe shaft to be oriented to access different portions of a workpiece and/or to approach a surface of a workpiece at a preferred or optimal approach angle.

The probe tip often has a spherical shape and a finite diameter, rather than being pointed or of another shape. A spherically shaped probe tip typically prevents the probe shaft from contacting a workpiece and allows a probe to approach a workpiece over a wide range of approach angles between the probe assembly and workpiece, when compared to a probe tip having a pointed tip. Spherically shaped probe tips may, however, make contact with a workpiece at different points on the probe tip itself, causing offsets that need to be compensated for when determining the actual point of contact as measured by the scales of a machine. Knowledge of the approach direction between the workpiece and probe tip, the diameter of the probe tip, and/or the general orientation of the workpiece surface being measured may be used to identify where on the probe tip contact occurred with the workpiece, and any offsets associated therewith.

A calibration routine and a calibration piece typically are used by a CMM to determine or to confirm the diameter of a probe tip. An accurate determination of probe tip diameter may be important to the accuracy of the measurements made by a CMM, since any inaccuracies in probe tip diameter measurements may render inaccurate measurements made by the CMM.

SUMMARY

A method is provided for determining probe tip diameters with improved accuracy and reliability that may, in turn, improve the accuracy of measurements made by a CMM. Systematically-varying, dynamic-type position errors may occur during probe tip calibration. These errors are not insignificant when dealing with highly precise measurements. Performing a routine for determining probe tip diameter multiple times with the arm of the CMM in different machine positions produces different error values for systematically-varying, dynamic-type position errors because many of these errors depend on the position of the tip along the machine axes. Averaging these systematically-varying, dynamic-type position errors across routines performed at different machine positions allows more accurate measurements to be made. An average probe tip diameter measurement generated by performing a routine for determining probe tip diameter multiple times at different machine positions produces a diameter measurement that is reliably closer to the actual probe tip diameter as compared to probe tip diameter measurements arrived at through individual probe tip diameter calibration routines.

According to one aspect, a method is disclosed for determining a diameter of a probe tip mounted via a probe shaft to an arm of a coordinate measuring machine. The arm is movable within a measurement volume of the CMM in each of an x-axis direction, a y-axis direction, and a z-axis direction. The x-axis direction, the y-axis direction, and the z-axis direction are each orthogonal to one another. The probe shaft is movable to different angular positions with respect to the arm. The method includes determining a first diameter measurement of the probe tip by performing a calibration routine using a calibration piece with the probe shaft positioned at a first angular position with respect to the arm. For at least at one contact point during the calibration routine for determining the first diameter measurement, the arm is positioned at a first x-axis position along the x-axis direction, a first y-axis position along the y-axis direction, and a first z-axis position along the z-axis direction. The probe shaft is moved to a second angular position with respect to the arm, different from the first angular position. A second diameter measurement of the probe tip is determined by performing the calibration routine using the calibration piece with the probe shaft positioned at the second angular position with respect to the arm. During the calibration routine for determining the second diameter measurement at least at one contact point that corresponds to the at least one contact point during the calibration routine for determining the first diameter measurement, the arm is positioned at a second x-axis position along the x-axis direction, a second y-axis position along the y-axis direction, and a second z-axis position along the z-axis direction. At least two of the second x-axis position, the second y-axis position, and the second z-axis position are different from the first x-axis position, the first y-axis position, and the first z-axis position respectively. The first diameter measurement and the second diameter measurement are averaged to determine the diameter of the probe tip.

According to another aspect, a method is disclosed for determining a diameter of a probe tip mounted via a probe shaft to an arm of a coordinate measuring machine. The arm is movable within a measurement volume of the CMM in each of an x-axis direction, a y-axis direction, and a z-axis direction. The x-axis direction, the y-axis direction, and the z-axis direction are each orthogonal to one another. The method includes determining a first diameter measurement of the probe tip by performing a calibration routine using a calibration piece with the calibration piece being positioned at a first calibration piece position within the measurement volume. At least at one contact point during the calibration routine for determining the first diameter measurement, the arm is positioned at a first x-axis position along the x-axis direction, a first y-axis position along the y-axis direction, and a first z-axis position along the z-axis direction. The calibration piece is moved to a second calibration piece position within the measurement volume, different from the first calibration piece position. A second diameter measurement of the probe tip is determined by performing the calibration routine using the calibration piece with the calibration piece positioned at the second calibration piece position within the measurement volume. During the calibration routine for determining the second diameter measurement at least at one contact point that corresponds to the at least one contact point during the calibration routine for determining the first diameter measurement, the arm is positioned at a second x-axis position along the x-axis direction, a second y-axis position along the y-axis direction, and a second z-axis position along the z-axis direction. At least two of the second x-axis position, the second y-axis position, and the second z-axis position are different from the first x-axis position, the first y-axis position, and the first z-axis position, respectively. The first diameter measurement and the second diameter measurement are averaged to determining the diameter of the probe tip.

According to another aspect, a method is discussed for determining a diameter of a probe tip mounted via a probe shaft to an arm of a coordinate measuring machine. The arm is movable within a measurement volume of the CMM in each of an x-axis direction, a y-axis direction, and a z-axis direction. The x-axis direction, the y-axis direction, and the z-axis direction are each orthogonal to one another. Movement of the arm along the x-axis direction is associated with a systematically varying x-axis position error. Movement of the arm along the y-axis direction is associated with a systematically varying y-axis position error. Movement of the arm along the z-axis direction is associated with a systematically varying z-axis position error. The method includes determining a first diameter measurement of the probe tip by performing a calibration routine using a calibration piece. At least at one contact point during the calibration routine for determining the first diameter measurement, the arm is positioned at a first x-axis position associated with a first x-axis position error value, a first y-axis position associated with a first y-axis position error value, and a first z-axis position associated with a first z-axis position error value. A second diameter measurement of the probe tip is determined by performing the calibration routine using the calibration piece. During the calibration routine for determining the second diameter measurement at least at one contact point that corresponds to the at least one contact point during the calibration routine for determining the first diameter measurement, the arm is positioned at a second x-axis position associated with a second x-axis position error value, a second y-axis position associated with a second y-axis position error value, and a second z-axis position associated with a second z-axis position error value, the second x-axis position error value, the second y-axis position error value, and the second z-axis position error value being different from the first x-axis position error value, the first y-axis position error value, and the first z-axis position error value, respectively. The first diameter measurement and the second diameter measurement are averaged to determine the diameter of the probe tip.

According to yet another aspect, a method is disclosed for determining a diameter of a probe tip mounted via a probe shaft to an arm of a coordinate measuring machine. The arm is movable within a measurement volume of the CMM in each of an x-axis direction, a y-axis direction, and a z-axis direction, wherein the x-axis direction, the y-axis direction, and the z-axis direction are each orthogonal to one another. The method includes performing a calibration routine using a calibration piece, wherein first and second sets of contact points between the probe tip and the calibration piece are defined. The machine position associated with at least one contact point of the first set of contact points differs by at least one of an x-axis position along the x-axis direction, a y-axis position along the y-axis direction, and a z-axis position along the z-axis direction from the machine position associated with at least one contact point of the second set of contact points. A first diameter measurement is determined from the first set of contact points. A second diameter measurement is determined from the second set of contact points. The first diameter measurement and the second diameter measurement are averaged to determine the diameter of the probe tip.

Various embodiments of the present invention are directed to methods, apparatuses, systems and software/firmware for determining a diameter of a probe tip mounted in a probe shaft to an arm of a coordinate measuring machine.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects of the invention relate to methods for calibrating a probe tip used by a CMM in a manner that reduces the impact of systematically-varying position errors. According to some aspects, a calibration routine for determining the diameter of a probe tip may be performed with an arm that holds the probe in a first machine position. The calibration routine may result in a first probe tip diameter measurement that includes systematically-varying position errors associated with the first machine position. The machine position may then be changed to a second machine position, and the calibration routine may be repeated to determine a second probe tip diameter measurement having systemically-varying position errors associated with the second machine position. The systematically-varying position errors of the first and second positions may have different values. The first and second probe tip diameter measurements, along with any subsequently measured probe tip diameter measurements, may be averaged to produce a probe tip diameter measurement, which may reduce the impact of systematically-varying position errors.

According to one aspect, the machine position may be altered for different calibration routines by orienting a probe assembly, including the probe tip and probe shaft, at different angular positions relative to the arm of a CMM. Placing the probe tip at different angular positions repositions the machine along two or more of the x-axis, y-axis, and z-axis for a subsequent calibration routine, even where the calibration piece remains in the same position for each of the calibration routines. Probe tip diameter measurements made with the probe assembly in different orientations then may be averaged to produce a diameter measurement that is less prone to errors resulting from systematically-varying position errors.

According to another aspect, a calibration piece used in a calibration routine to determine probe tip diameter may be moved to different positions within the measurement volume of a CMM. The calibration routine then may be repeated with the calibration piece and arm of the CMM in different machine positions. By way of example, the calibration routine may be performed on the calibration piece, which is often a calibration sphere, with the calibration piece mounted to the table of a CMM at a first position within the measurement volume. The calibration piece then may be moved and mounted to the table at a second position within the measurement volume so that the calibration routine may be performed a second time with the calibration piece in the second position. Resulting diameter measurements of the first and second calibration routines, and any additional calibration routines that are performed, may be averaged to provide a probe tip diameter measurement.

Figure 1:
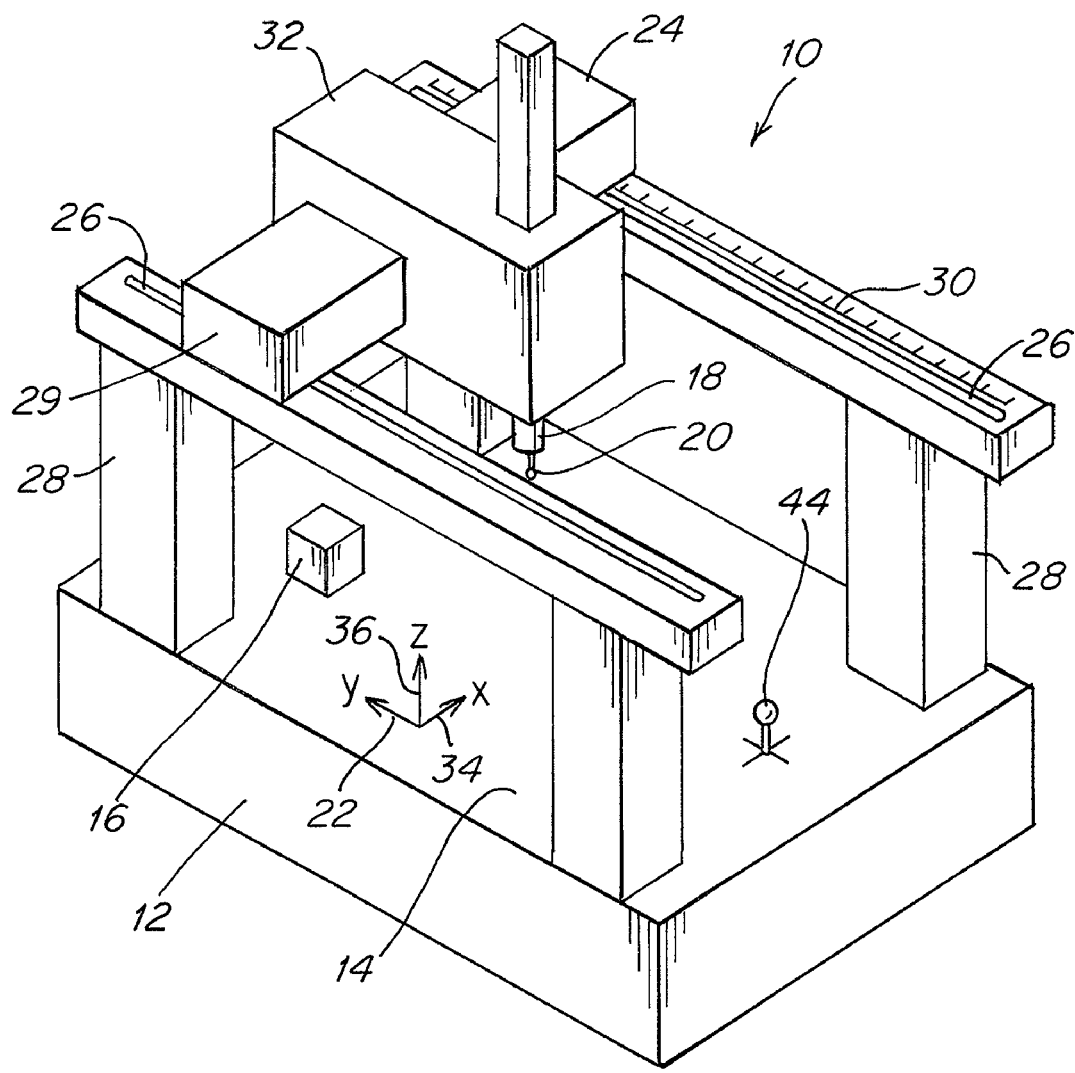
FIG. 1 is a top perspective view of conventional bridge-type CMM.

A conventional bridge-type CMM 10 is illustrated in FIG. 1. The CMM 10 includes a base 12, a table 14 to which a workpiece 16 is secured, an arm 18, and a probe assembly 20 mounted to the arm for sensing and signaling contact with the workpiece. The probe assembly 20 is movable throughout a measurement volume along three orthogonal axes x, y and z. For movement along the y-axis 22, a bridge 24 is movably supported by two guideways 26. The guideways may be supported on a base 12 by legs 28. One or both of the right and left guideways 26 include scales 30 from which readings are taken to establish the position of the corresponding end of the bridge. The bridge supports a carriage 32 which moves in a horizontal direction along the x-axis 34, which is perpendicular to the bridge movement. Mounted to the carriage 32 is a vertically-movable arm 18 which moves along the z-axis 36 and carries the probe assembly 20.

In a CMM used in a typical shop or manufacturing environment, bridge 24 may be driven by a single drive 29 and have one set of scales 30 disposed on a guideway 26 opposite the guideway having drive 29. Guideways 26 typically include bearings (not shown) along which bridge 24 rides. In a manufacturing or shop environment, mechanical bearings often must be used, as opposed to air bearings, since manufacturing and shop environments cannot be controlled sufficiently to prevent dirt from interfering with operation of such air bearings.

For purposes herein, the term "coordinate measurement machine" or "CMM" refers generally to any type of machine that includes a probe, whether a contact-type probe or otherwise, that is movable throughout a measurement volume to take measurements on a workpiece therein. For ease of understanding, and without limiting the scope of the invention, the description of the invention herein is made with reference to a bridge-type CMM configured for use on a manufacturing shop floor. It is to be understood, however, that the present invention is not limited to use with a bridge-type CMM, but is applicable to any type of CMM, including, without limitations, vertical-type CMM's, horizontal-type CMM's, manual CMM's, gantry-type CMM's, and non-contact type CMM's. It is also to be understood that the term "workpiece," for purposes herein, is any object placed within the measurement volume of the coordinate measuring machine such that it may be measured. As used herein, the term "machine position" refers to the position of arm 18, to which probe assembly 20 is mounted, within the measurement volume of a CMM. Similarly, x-axis position, y-axis position, and z-axis position refer to the position of arm 18 along the x-axis, y-axis, and z-axis, respectively.

Figure 2:
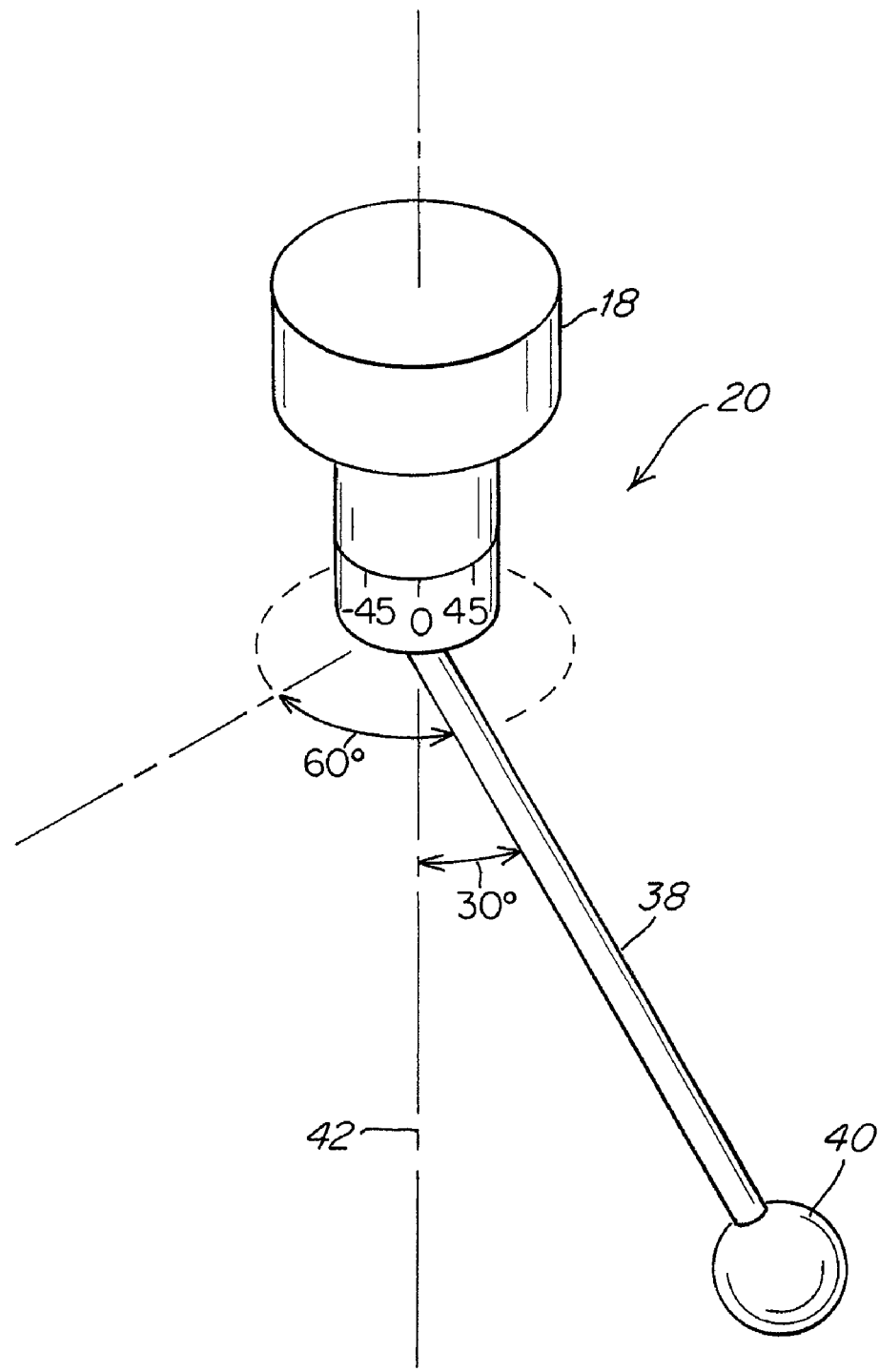
FIG. 2 is a top perspective view of components of a probe assembly and calibration sphere, according to one embodiment.

As shown in FIG. 2, a probe assembly 20 may include a probe shaft 38 that is mountable at a first end to arm 18 of a CMM 10, and a probe tip 40 that is disposed at a second end of probe shaft 38. The angular orientation of probe shaft 38 may be adjusted to accommodate workpieces of different geometries. As illustrated, the probe assembly includes a mechanism that allows the probe shaft 38 to be indexed at fixed angles, such as thirty degrees, sixty degrees, and/or ninety degrees angles, with respect to an axis 42 that extends through arm 18 of the CMM. Additionally, probe shaft 38 is indexable around axis 42 at different positions in a plane orthogonal to axis 42, such as positions spaced from one another by forty-five degrees, or sixty degrees (as shown). It is to be appreciated that FIG. 2 illustrates but one type of probe assembly with which aspects of the present invention may be employed, and that other probe assemblies, including non-contact type probes, also may be used.

Probe tip 40 may be spherical in shape to allow tip 40 to contact workpieces from different approach directions. Accurate knowledge of the actual diameter of probe tip 40 is used to determine any offsets between the actual contact point between the probe tip and a workpiece, and the center of the sphere which is the effective location of that position on the workpiece which is measured by the scales of a machine. Accurate determination of probe tip diameters reduces measurement errors and prevents inaccuracies associated with the probe tip diameter measurement from infecting measurements made by a CMM.

Errors associated with measurements made by a CMM, such as machine 10, including those that are present during probe tip diameter calibration routines, may be classified as first term components and second term components. The first term component is associated with dynamic characteristics of movement of the machine, and is typically assigned a constant value, regardless of machine position or the length of the workpiece that is being measured. The second term component is generally associated with the shape of the structure of the CMM. For instance, one type of second term component may be the linearity of guideways along each axis, which varies as a function of the length of the workpiece that is being measured. Overall measurement errors for CMM's may be expressed as a combination of the first and second term components, such as for example 0.0039 mm+0.001 mm×L, where 0.0039 mm represents the first term component and 0.001 mm×L represents the second term component multiplied by the length "L" of a part that may be measured.

First term components may include both constant and variable errors. Constant first term components include the influences of friction and static bending or flexing of a CMM. Friction may cause the actual position of a probe tip, when traveling back and forth, to lag behind a position as indicated by scales 30 of the machine, causing a hysteresis error.

Another type of constant first term component includes rotation of bridge 24 or other movable components of a CMM, particularly when the bridge is being driven by only a single drive on one of a pair of guideways 26, as has become common to reduce machine costs. Friction at the non-driven end of bridge 24 may cause the non-driven end to lag slightly behind the driven end as the bridge is moved. This friction rotates the bridge about a vertical axis such that a yaw error exists in bridge 24. The yaw error affects the actual position of a probe tip mounted to the bridge, as compared to the position measured by scales 30. This type of error is discussed in greater detail in U.S. Pat. No. 7,249,421, which is incorporated herein by reference in its entirety.

Hysteresis errors, yaw errors, and other constant first term components may be identified and compensated for through various calibration techniques, such as those described in U.S. Pat. No. 7,249,421. Information associated with these types of errors may be saved within a memory module, within a software module, as part of firmware, or in any other suitable manner.

Variable first term components, however, are more difficult to identify and compensate. Variable first term components also may include variable components that have values which change as machine position is altered. Various phenomena may contribute to variable first term components including motor detenting, inertial forces, entry of ball bearings into tracks of recirculating bearings, drive belt slippage, and varying friction, to name a few.

Figure 3:
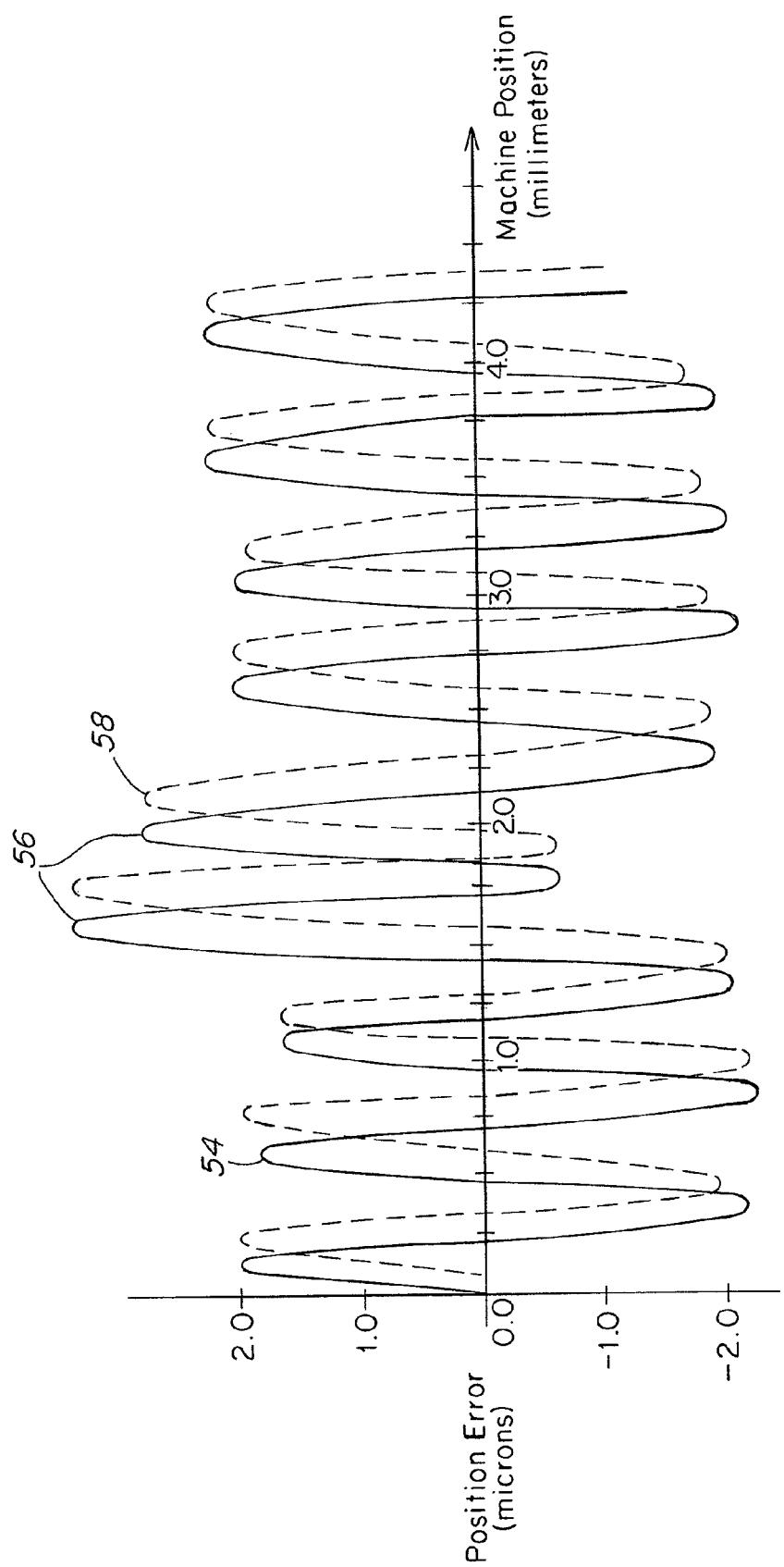
FIG. 3 is a graph representative of position errors associated with motor detenting, and other types of varying first component errors of probe position in a CMM, according to some embodiments.

Motor detenting refers to the systematic variations in position, velocity, and acceleration that occur in electric motors, such as the motors which are used to move the arm 18 of a CMM 10 about the measurement volume. Motor detenting may be caused when a motor coil moves through preferred positions in relation to magnetic fields of the motor as the motor rotates. In many instances, the variation in position 54 associated with motor detenting may be sinusoidal, as illustrated in FIG. 3. In the example of FIG. 3, motor detenting produces a sinusoidal variation having a peak-to-peak amplitude of about 0.004 mm and wavelength of about 0.5 mm. It is to be appreciated that the values shown in FIG. 3 are representative of one embodiment, and that motor detenting in other embodiments may result in position errors that vary systematically having different curve shapes and magnitudes.

Inertial forces associated with movement of probe 20 about the measurement volume of CMM 10 also may contribute to variable first term components. Inertial forces associated with the mass of the arm 18 and other components that move with a probe from position to position in a measurement volume may vary according to the mass of these components, which axes are changing, and the speed of the movement. The degree to which the arm 18 and other components accelerate and/or decelerate during movement, particularly just before contact is made between a probe and workpiece, may impact the extent to which inertial forces cause position errors. Greater acceleration and/or masses may cause the structure of a CMM to flex and then to vibrate harmonically, causing further measurement errors.

Mechanical bearings, as may be found in CMM's for use in manufacturing and shop environments may, additionally or alternatively, be a source of systematically-varying first term component errors. By way of example, the re-entry of bearings into the track of a recirculating-type ball bearing may cause unsteady motion that systematically repeats. Position errors associated with ball bearing re-entry are shown in FIG. 3 as a brief jump 56 in position that occurs about every six millimeters as the arm of CMM 10 moves about the measurement volume along any one or more of the different axes. Errors associated with ball bearing re-entry into bearing tracks may have a longer wavelength and smaller amplitude than errors associated with motor detenting. It is to be appreciated, however, that FIG. 3 represents one example of the error caused by motor detenting and ball bearing re-circulation and that error curves having different shapes, magnitudes and wavelengths are also possible.

In addition to being a source of potential position errors, mechanical bearings or "hard bearings," may amplify or exacerbate the impact of other types of variable first term component errors. Hard bearings provide a mechanical path through which vibration and associated position errors may be more readily transferred in a CMM. While air bearings may reduce or substantially eliminate the impact of motor detenting, friction, and other types of errors through the very low friction interface of the air bearing itself, air bearings cannot be used in harsh manufacturing or shop environments. Additionally or alternatively, more advanced controllers may help reduce first term component errors. These controllers are often expensive, however, and may not be installed cost effectively in CMM's suited for manufacturing environments.

The manner in which first term component-type errors systematically vary may change over time, further complicating identification and compensation for these types of errors. Belts and other drive train components used in combination with motors to move a probe about the measurement volume of a machine may slip and/or stretch over time, disrupting the systematic nature of some first term component errors. For instance, the sinusoidal error associated with motor detenting 54 may shift, as represented by the dashed line 58 in FIG. 3, as a belt slips or stretches. Additionally or alternatively, ball bearings may shift in recirculating-type bearings. This shifting may also cause, over time, changes to the manner in which first term component errors systematically vary.

Systematically-varying, first term component errors have caused routines for determining the diameter of a probe tip 40 to produce variable results when repeated at different machine positions. Intentionally including systematically-varying errors in multiple calibration routines for determining probe tip diameter may allow such errors to be minimized. To minimize or compensate for such errors, calibration routines may be performed at different machine positions, resulting in diameter measurements that are associated with different systemically-varying errors (i.e., different points on the graph shown in FIG. 3). The degree to which systemically-varying errors impact diameter measurements may be identified through comparisons of differences in diameter measurements when multiple diameter determinations are made: a) with the machine in the same position during different occurrences of a diameter calibration routine; and b) with the machine in different machine positions during different occurrences of a diameter calibration routine. Additionally or alternatively, the impact of systematically-varying first term component errors on calibration routines for determining probe tip diameter may be reduced by averaging diameter measurements obtained by performing calibration routines at different machine positions. The phrase "different machine positions" means different scale readings in one or more of the x, y and z axes at corresponding contact points of calibration routines because, as it is to be appreciated, scale readings typically change as the position of the arm of a CMM changes when a calibration routine is being performed.

Figure 4:
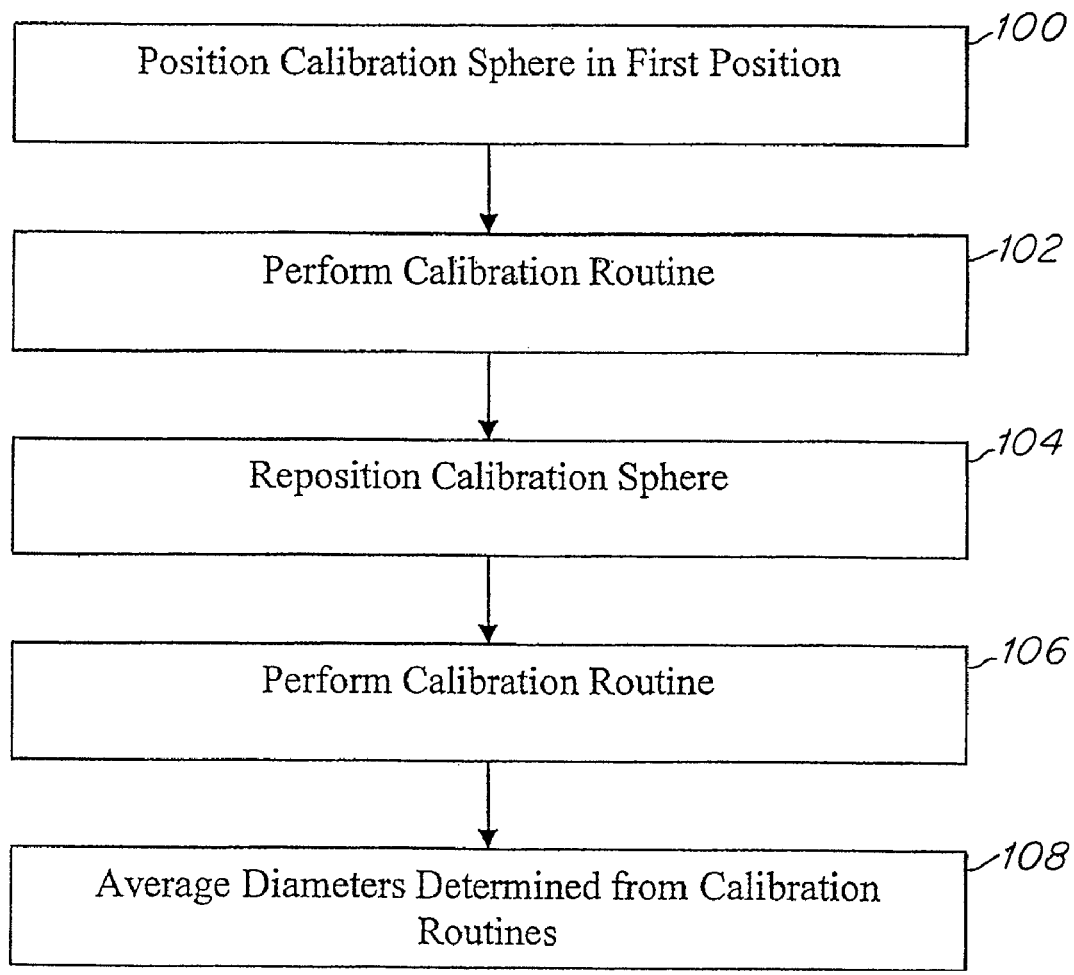
FIG. 4 is a flow chart representative of a method for calibrating a probe tip that includes moving a calibration sphere to different positions within a measurement volume, according to one embodiment.

Machine positions may be altered between calibration routines by repositioning a calibration sphere 44, or other calibration piece, within the measurement volume of a CMM 10, as represented in the flow chart of FIG. 4. The calibration sphere 44 may be mounted to the table 14 of a machine (as shown in FIG. 1) in a first position in an act 100 and a first calibration routine may be performed in an act 102 to produce a first diameter measurement. The calibration sphere may then be repositioned within the measurement volume in an act 104, such that the calibration routine may be repeated a second time in an act 106 to produce a second diameter measurement that incorporates different values of first term component errors. The calibration routines used in acts 102 and 106 typically are the same and are known to those of skill in the art. It is to be appreciated that the calibration sphere may be moved and calibration routines may repeated any number of times, including up to 2 times, up to 4 times, up to 5 times, up to 6 times, up to 10 times, up to 20 times, or even more times to produce diameter measurements at different values of systematically varying errors. Diameter values obtained from each of the calibration routines then may be averaged in an act 108 to provide a diameter measurement that is impacted to a lesser degree by systematically-varying errors. The calibration sphere 44 may be moved between positions that differ only along a single axis (i.e., one of the x-axis, y-axis, or z-axis) between calibration routines, or between positions that differ along two axes or along all three axes, as is to be appreciated by one of skill in the art. Additionally or alternatively, multiple calibration spheres may be positioned within the measurement volume, and calibration routines may be performed on each of the calibration spheres to produce diameter measurements associated with different machine positions, which are then averaged.

Figure 5:
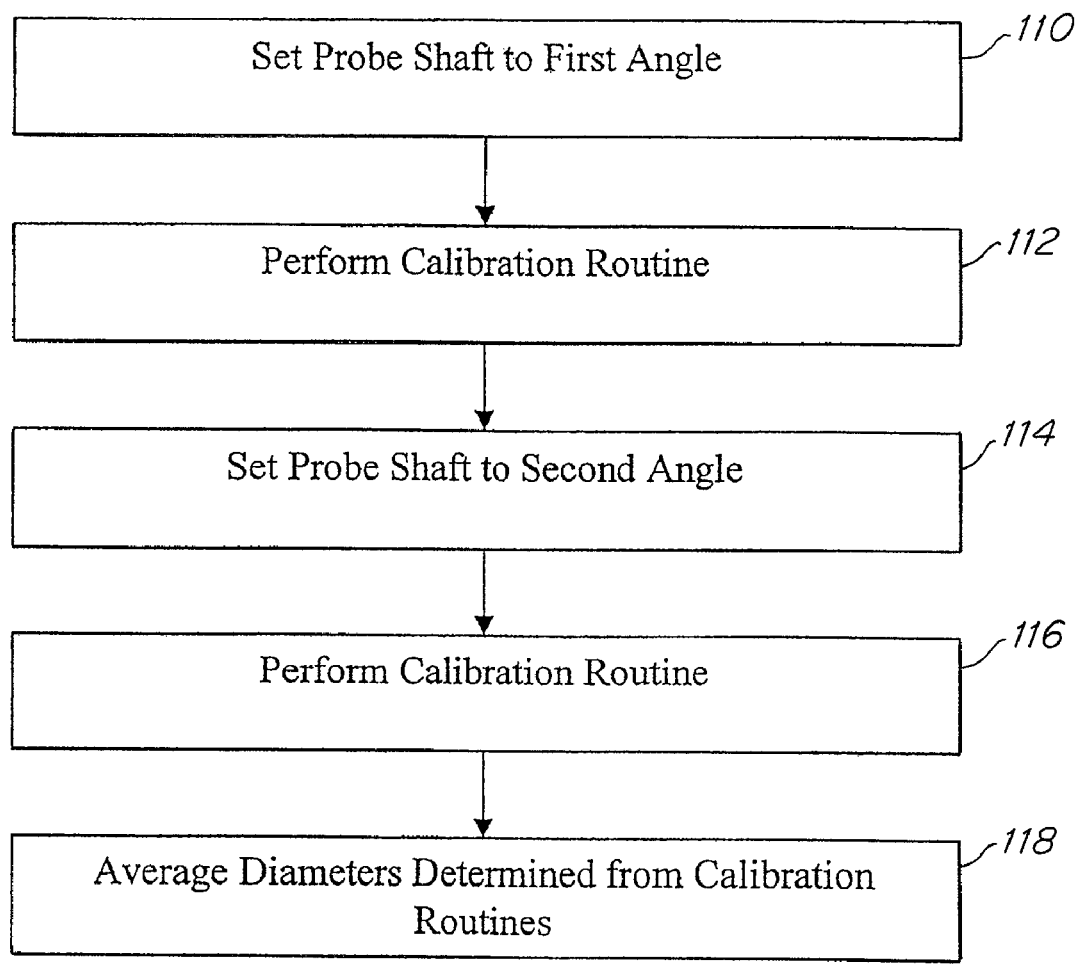
FIG. 5 is a flow chart representative of a method for calibrating a probe tip that includes changing the angle of a probe assembly between calibration routines, according to one embodiment.

Other techniques may be used to calibrate a probe tip diameter at different machine positions. For example, the machine position may be altered for different calibration routines merely by changing the angle at which a probe shaft 38 is positioned relative to the arm 18 of a CMM, as represented in the flow chart of FIG. 5. As shown, the probe shaft is set to a first angle with respect to the arm of the CMM in an act 110, and a first calibration routine is performed in an act 112. In an act 114, the probe shaft is then set to a second angle that is different from the first angle, and a second calibration routine is performed in an act 116. The calibration routines used in acts 112 and 116 typically are the same and are known to those of skill in the art. Changing the probe shaft angle between calibration routines causes the machine position to change for corresponding contact points of the calibration routines. Changing the machine position changes the values of systematically varying errors in the different calibration routines (e.g., contact points of the different routines are associated with different points on the graph shown in FIG. 3). The diameter values obtained from each of the calibration routines then may be averaged in an act 118 to produce a diameter value that is less impacted by systematically-varying errors. In the method represented by FIG. 5, multiple calibration routines may be performed without the labor associated with relocating a calibration sphere 44 and without having multiple calibration spheres 44 positioned within the measurement volume, as in the method represented by FIG. 4.

Other techniques may, additionally or alternatively, be used to alter the machine position of a CMM between calibration routines, as aspects of the invention are not limited in this regard. For example, probe tip diameters may also be determined by making measurements with a CMM in different machine positions without relocating a calibration piece and without altering the angular orientation of probe shaft 38. According to one embodiment, different calibration routines may be used for a given angular orientation of probe shaft 38. In this embodiment, the probe tip contacts the calibration piece at a first set of contact points and then at least at a second set of contact points that is different from the first set of contact points. The first set of contact points includes at least one point that is associated with a machine position that differs from the machine position associated with at least one contact point in the second set of contact points by one or more of an x-axis position, a y-axis position, and a z-axis position. Three, four or even more sets of contact points may be used for a third or fourth or more measurements, respectively. The machine position associated with one or more of the contact points in each set differs from the machine position associated with at least one of the contact points in each of the other sets of contact points. The probe tip diameter determined from one set of contact points typically is different from the probe tip diameter determined from each of the other sets of contact points. The difference in probe tip diameters determined from different sets of contact points reflects different first term component errors since each diameter is calculated based on contact points associated with different positions on the graph shown in FIG. 3. The different probe tip diameters may then be averaged. According to one embodiment, three different sets of contact points are used, each set having 13 different contact points for a total of 39 contact points. Three probe tip diameters are determined from these three sets and these three diameters are averaged. The resulting averaged probe tip diameter is less prone to first term component errors. It is to be appreciated that different numbers of contact points and/or subsets of contact points may be used, as the invention is not limited in this respect.

Figure 6:
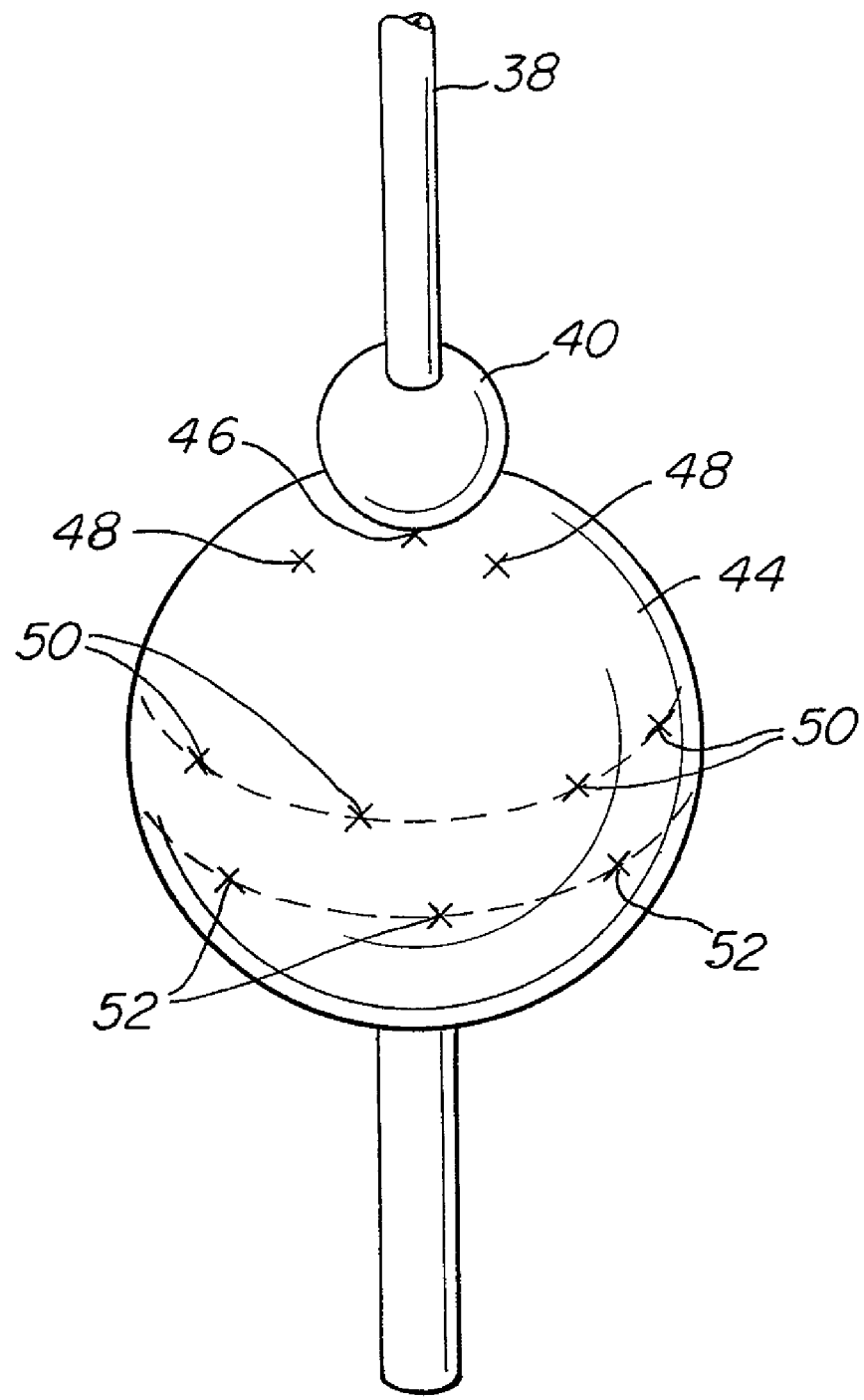
FIG. 6 is a top perspective view of a calibration sphere and contact points that may be made on the calibration sphere by a probe tip during a calibration routine, according to one embodiment.

Probe tip diameter determinations, or calibration routines, may be performed at machine startup, or at any other time during machine use. According to one exemplary embodiment, a calibration routine is begun by guiding a probe 20 under manual control mode into contact with a calibration sphere 44, as shown in FIG. 6. The initial contact point 46 may be made such that the probe shaft 38 is generally orthogonal to the sphere surface. This measurement identifies a gross position of the sphere 44 for a controller of the CMM 10. An automatic diameter determination routine is then started by contacting three points 48 disposed about the initial contact point of the calibration sphere 44, also referred to as the "north pole" of the calibration sphere 44. These three additional contact points 48, in combination with the initial contact point 46, may be used to calculate a center position of the calibration sphere 44. With the center position of sphere 44 known, the probe 20 automatically moves to measure seven additional contact points 50 about the outer diameter of sphere 44 at positions that are spaced longitudinally from the initial contact point 46 as illustrated in FIG. 6 (e.g., sixty degrees from the north pole, as measured from a center position of the sphere). Six additional contact points 52 may then be measured with the calibration sphere 44 about a circle that lies at a 90 degree longitudinal angle with respect to the initial contact point (e.g., around the "equator" of the calibration sphere). The measured contact points between the probe tip and calibration sphere (or other device) are used to determine a probe tip diameter. According to some embodiments, the difference between the actual diameter of the calibration sphere 44, which is known beforehand, and the diameter of the sphere measured by all of the contact points 46, 48, 50 and 52 is used to determine the diameter of the probe tip itself. According to other embodiments, only some of the contact points may be used in diameter calculators, such as contact points 48 and 50. It is to be appreciated that the above described routine is but one routine that may be used to determine probe tip diameter, and that others may be used, including diameter determination routines that are performed completely manually, routines that use calibration pieces other than spheres, and the like.

The machine position varies during a calibration procedure for determining probe tip diameter as the probe tip contacts a calibration sphere at different points, as described above. For example, the machine position is different when a probe tip makes contact at each of the initial contact point, the three additional contact points 48, the seven additional contact points 50, and the six additional contact points 52. The seven contact points 50 and six contact points 52 that are used to calculate a diameter value are each differently and individually impacted by systematically-varying first term component errors because the measurements are taken on different spots on the curve of FIG. 3. These contact points 50 and 52 that are used to determine a first diameter are affected by a systematically varying first term component error in a first manner. Similarly, the contact points 50 and 52 taken by a second calibration routine performed with the CMM in a different machine position will be affected by systematically-varying first term component error in a different manner than in the first machine position. A diameter value determined by averaging the first and second diameter values therefore is a more accurate value in which the systematically-varying first term component errors offset one another. For example, systematically-varying error values that are above the x-axis offset values that are below the x-axis (e.g., as shown in FIG. 3) and vice-versa. That is, a probe tip diameter calculation that results from a calibration routine performed with a machine position associated with a positive side of the curve represented in FIG. 3 may include positive errors. Similarly, a probe tip diameter calculation that results from a calibration routine performed with a machine position associated with a negative side of the curve represented in FIG. 3 may include negative errors. These negative and positive errors at least partially offset each other through averaging.

If, however, the machine position were changed between calibration routines by a distance that is equivalent to the wavelength of the systematically varying error, or a whole number multiple thereof, the diameter calculations may be performed with the same systematically varying errors, such that averaging would have little or no impact on reducing such errors. Thus changing the machine position for different calibration routines by an amount that is not a whole number multiple of a systematically varying error may help ensure that calibration routines performed at the different machine positions may in fact be exposed to different values of systematically-varying errors. By way of example, in the embodiment of FIG. 3, machine position may be changed by a value that is not a multiple of 0.5 microns (the wavelength of the error associated with motor detenting for a particular CMM) or a multiple of 6 mm (the wavelength associated with entry of a re-circulating ball bearing into a bearing track for a particular CMM).

Wavelengths of first term component errors may be estimated through various techniques. Knowledge of first term component error wavelengths may allow machine position to be adjusted in a manner that helps ensure that a CMM is exposed to differing values of systematically varying errors when the machine position is altered. The wavelength of first term component errors associated with motor detenting may be estimated with knowledge of the number of detents that a motor experiences during a complete rotation, and any transmission factors associated with drive wheels and pulleys that connect the electric motor to moving portions of the CMM. By way of example, according to one embodiment, the construction of a motor may be such that 20 detents occur per motor revolution of a 20 mm diameter shaft, resulting in detents that occur with a wavelength of about 0.32 mm. This is calculated by dividing the number of detents per rotation by the distance of linear travel associated with one rotation of the motor (i.e., Π times the shaft diameter). Transmission components, such as pulleys, gears, and the like, that are between the motor shaft and components of the CMM that are being moved may, however, increase or decrease the degree to which the components move per revolution of a motor shaft. Transmission devices having a transmission factor of about 1.56 may change the 0.32 mm wavelength associated with the above described motor to a wavelength of about 0.5 mm (0.32 mm×1.56=0.5 mm). Wavelengths or periods of associated with entry of a ball bearing in to the track of recirculating bearings may also be estimated with knowledge of average ball bearing spacing, which is roughly the equivalent to the bearing diameter.

After determining the diameter of probe tip 40, additional routines may be performed to calibrate other aspects of a CMM or to validate the diameter defined by the probe tip diameter calibration routine. According to some embodiments, routines may be run, either automatically or manually, that contact the probe tip 40 to surfaces of a step gauge-type calibration piece. Step gauge calibration pieces include blocks of known dimensions that may be measured to determine the accuracy of a CMM. This machine qualification may be performed for each new probe shaft angle or location of the calibration sphere within the measurement volume.

According to some embodiments, databases may be maintained that keep track of diameter measurements for each probe assembly that may be used with a particular CMM. Diameter measurements for each probe assembly may be taken from the database and averaged to provide a diameter measurement for use in measuring a workpiece. This database may reduce the labor and/or time associated with altering machine position and running calibration routines multiple times after a probe assembly has been used many times. According to some embodiments, only recent diameter measurements may be averaged for probe assemblies, such as measurements taken within the previous week, month, or other timeframe. Additionally or alternatively, different numbers of diameter measurements may be used to generate an average diameter.

According to some embodiments, CMM's may include a controller and a database which control operation of calibration routines and storage of diameter measurements. The controller and database combination (not shown) may be implemented in any of several manners. For example, the controller and database combination may be implemented using hardware, software or a combination thereof. When implemented in software, the software code can be executed on any suitable processor or collection of processors, whether provided in a single computer or distributed among multiple computers. It should be appreciated that any component or collection of components that perform the functions described herein can be generically considered as one or more controllers that control these functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a memory stick, a compact disk, a tape, etc.) encoded with a treatment protocol in the form of a computer program (i.e., a plurality of instructions), which, when executed by the controller, performs the herein-discussed functions of the embodiments of the present invention. In addition, it should be appreciated that the reference to a calibration routine or controller which, when executed, performs the herein-discussed functions, is not limited to an application program running on a host computer. Rather, the various methods described herein in a generic sense reference any type of computer code (e.g., software or microcode) that can be employed to program a processor to implement the herein-discussed aspects of the present invention.

The foregoing written description is considered to be sufficient to enable one skilled in the art to practice the invention. The present invention is not to be limited in scope by the following examples, since the examples are intended as illustrations of certain aspects of the invention. Other functional equivalent embodiments are also within the scope of the invention(s).

EXAMPLES

Example 1

Diameter measurements were made with a probe assembly in which a 125 mm long shaft 38 was disposed at five different angular orientations with respect to arm 18 of a CMM. These five angular orientations were associated with five different machine positions. Diameter measurements were repeated three times at each of these five different machine positions. The resulting probe diameter measurements are shown in Table 1 below. All diameter measurements are reported in millimeters. The convention used to identify a probe shaft angle includes the letter "A" followed by the angle of the probe shaft with respect to central axis 42 of arm 18 and the letter "B" followed by the rotational angle of a probe shaft about central axis 42 of arm 18.

TABLE 1

Probe Diameter Measurements with Different Probe Shaft Angles

| Position 1 (A0B0) | Position 2 (A30B135) | Position 3 (A30B-135) | Position 4 (A30B45) | Position 5 (A30B-45) |
|---|---|---|---|---|
| 2.9974 | 2.9966 | 2.9964 | 2.9985 | 2.9983 |
| 2.9977 | 2.9963 | 2.9964 | 2.9984 | 2.9980 |
| 2.9978 | 2.9964 | 2.9962 | 2.9984 | 2.9982 |

Diameter measurements vary across different machine positions through a range of about 0.002 mm, occasionally increasing to a range of about 0.003/0.004 mm, which is representative of systematically varying first term component errors. However, measurements taken at the same machine position varied substantially less.

Repeated diameter measurements taken at a position may provide an operator with the false belief that, because a diameter measurement repeats itself, that this diameter measurement is "good," and is not affected by systematically-varying errors.

The calibration sphere was then moved to a different x-axis and y-axis position on a table of the CMM. Diameter measurements were again made with a probe assembly at each of five different angular orientations with respect to an arm of the CMM. As with the calibration routines associated with Table 1, diameter measurements were repeated three times at each of the five different machine positions. The resulting probe diameter measurements are shown in Table 2 below. All diameter measurements are reported in millimeters.

TABLE 2

Probe Diameter measures with Different Probe Shaft Angles and Calibration Sphere at Different X-Axis and Y-Axis Position

| Position 1 (A0B0) | Position 2 (A30B135) | Position 3 (A30B-135) | Position 4 (A30B45) | Position 5 (A30B-45) |
|---|---|---|---|---|
| 2.9969 | 2.9977 | 2.9977 | 2.9971 | 2.9954 |
| 2.9967 | 2.9975 | 2.9979 | 2.9967 | 2.9956 |
| 2.9966 | 2.9981 | 2.9977 | 2.9972 | 2.9960 |

The diameters reported in table 2 again vary across a range of about 0.002 mm, with successive runs at the same positions varying across smaller ranges. It is also noted that ranges may vary across repeated runs at the same machine positions to different degrees. By way of example, the measurements associated with position 3 are generally larger than measurements at other positions while the measurements associated with position 4 were slightly smaller than the measurements at other positions. The differences in these diameter measurements may be associated with systematically-varying position errors.

Example 2

In a second example, the probe shaft angle was changed for each of seven probe tip calibration routines that were performed in combination with a qualifying routine for a CMM. In the qualifying routine, 20 mm gauge blocks were aligned along each of seven orientations, and a probe tip diameter calibration routine was performed prior to measuring each of the 20 mm gauge blocks. The probe shaft angle was changed for each of the calibration routines, as indicated in Table 3. The seven orientations included orientations parallel to x, y, and z axes, as well as four orientations that were at various angles to the x, y, and z axes, including a diagonal designated as (+X+Y+Z) that ran along the positive x, y and z directions, a diagonal designated as (−X+Y+Z) that ran along the negative x and positive y and z directions, a diagonal designated as (−X−Y+Z) that ran along the negative x and y directions and the positive z direction, and a diagonal designated as (+X−Y+Z) that ran in the positive x and z directions and negative y direction. Measurements in these directions provided an indication of the combined effects of hysteresis error (constant first term component error) and probe diameter calibration error (variable first term component error).

Table 3 shows first term component errors that resulted from calibrations performed along each of the orientations both with probe tip diameters calculated from a single calibration routine performed prior to measurements made along each orientation, and with a probe tip diameter calculated by averaging the probe tip diameters developed from measurements made along all of the orientations. As shown, the CMM qualifying procedure produced a maximum first term component error of 0.0008 mm when the method of the present invention was used, as opposed to a 0.0028 mm first term component error when probe tip diameters were used without averaging—a reduction of 2 microns in first term component error.

TABLE 3

| Axis | Probe Shaft Angle | Measured Probe Tip Diameter (mm) | Averaged Probe Tip Diameter (mm) | Gauge Block Error (First Term Error) Measured Probe Tip Diameter (mm) | Gauge Block Error (First Term Error) Averaged Probe Tip Diameter (mm) |
|---|---|---|---|---|---|
| Linear X | A0 B0 | 3.0014 | 2.9999 | −.0018 | −.0003 |
| Linear Y | A0 B0 | 3.0014 | 2.9999 | −.0022 | −.0007 |
| Linear Z | A90 B0 | 2.9987 | 2.9999 | +.0004 | −0008 |
| (+X + Y + Z) | A30 B135 | 2.9992 | 2.9999 | +.0007 | −.0001 |
| (−X + Y + Z) | A30 B-135 | 2.9993 | 2.9999 | .0000 | −.0006 |
| (−X − Y + Z) | A30 B-45 | 2.9990 | 2.9999 | +.0011 | +0002 |
| (+X − Y + Z) | A30 B45 | 3.0021 | 2.9999 | −.0028 | −.0006 |
| Overall Greatest First Term Error (mm) | | | | −.0028 | −.0008 |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of determining a diameter of a probe tip mounted via a probe shaft to an arm of a coordinate measuring machine, the arm being movable within a measurement volume of the coordinate measurement machine in each of an x-axis direction, a y-axis direction, and a z-axis direction, wherein the x-axis direction, the y-axis direction, and the z-axis direction are each orthogonal to one another, the probe shaft movable to different angular positions with respect to the arm, the method comprising:

determining a first diameter measurement of the probe tip by performing a calibration routine using a calibration piece with the probe shaft positioned at a first angular position with respect to the arm, wherein at least at one contact point during the calibration routine for determining the first diameter measurement, the arm is positioned at a first x-axis position along the x-axis direction, a first y-axis position along the y-axis direction, and a first z-axis position along the z-axis direction;

moving the probe shaft to a second angular position with respect to the arm, different from the first angular position;

determining a second diameter measurement of the probe tip by performing the calibration routine using the calibration piece with the probe shaft positioned at the second angular position with respect to the arm, wherein during the calibration routine for determining the second diameter measurement at least at one contact point that corresponds to the at least one contact point during the calibration routine for determining the first diameter measurement, the arm is positioned at a second x-axis position along the x-axis direction, a second y-axis position along the y-axis direction, and a second z-axis position along the z-axis direction, at least two of the second x-axis position, the second y-axis position, and the second z-axis position being different from the first x-axis position, the first y-axis position, and the first z-axis position, respectively; and averaging the first diameter measurement and the second diameter measurement to determine the diameter of the probe tip.

2. The method of claim 1, wherein each of the second x-axis position, the second y-axis position, and the second z-axis position is different from the first x-axis position, the first y-axis position, and the first z-axis position, respectively, at the at least one contact point during the calibration routine for determining the second diameter measurement that corresponds to the at least one contact point during the calibration routine for determining the first diameter measurement.

3. The method of claim 2, wherein the at least one contact point during the calibration routine for determining the first diameter measurement corresponds to at least an initial contact between the probe tip and the calibration piece during the calibration routine for determining the first diameter measurement; and the at least one contact point during the calibration routine for determining the second diameter measurement corresponds to at least an initial contact between the probe tip and the calibration piece during the calibration routine for determining the second diameter measurement.

4. The method of claim 3, wherein the at least one contact point during the calibration routine for determining the first diameter measurement includes all contacts between the probe tip and the calibration piece during the calibration routine for determining the first diameter measurement and the at least one contact point during the calibration routine for determining the second diameter measurement includes all contact points between the probe tip and the calibration piece, during the calibration routine for determining the second diameter measurement, that correspond to contact points between the probe tip and the calibration piece during the calibration routine for determining the first diameter measurement.

5. The method of claim 3, wherein the calibration piece includes a spherical ball positioned in the measurement volume.

6. The method of claim 3, further comprising:

moving the probe shaft to additional angular positions, different from the first angular position and the second angular position;

determining additional diameter measurements of the probe tip by performing the calibration routine using the calibration piece with the probe shaft positioned at each of the additional angular positions with respect to the arm; and averaging the additional diameter measurements with the first diameter measurement and the second diameter measurement to determine the diameter of the probe tip.

7. A method of determining a diameter of a probe tip mounted via a probe shaft to an arm of a coordinate measuring machine, the arm being movable within a measurement volume of the coordinate measurement machine in each of an x-axis direction, a y-axis direction, and a z-axis direction, wherein the x-axis direction, the y-axis direction, and the z-axis direction are each orthogonal to one another, the method comprising:

determining a first diameter measurement of the probe tip by performing a calibration routine using a calibration piece with the calibration piece positioned at a first calibration piece position within the measurement volume, wherein at least at one contact point during the calibration routine for determining the first diameter measurement, the arm is positioned at a first x-axis position along the x-axis direction, a first y-axis position along the y-axis direction, and a first z-axis position along the z-axis direction;

moving the calibration piece to a second calibration piece position within the measurement volume, different from the first calibration piece position;

determining a second diameter measurement of the probe tip by performing the calibration routine using the calibration piece with the calibration piece positioned at the second calibration piece position within the measurement volume, wherein during the calibration routine for determining the second diameter measurement at least at one contact point that corresponds to the at least one contact point during the calibration routine for determining the first diameter measurement, the arm is positioned at a second x-axis position along the x-axis direction, a second y-axis position along the y-axis direction, and a second z-axis position along the z-axis direction, at least two of the second x-axis position, the second y-axis position, and the second z-axis position being different from the first x-axis position, the first y-axis position, and the first z-axis position, respectively; and averaging the first diameter measurement and the second diameter measurement to determining the diameter of the probe tip.

8. The method of claim 7, wherein each of the second x-axis position, the second y-axis position, and the second z-axis position is different from the first x-axis position, the first y-axis position, and the first z-axis position, respectively, at the at least one contact point during the calibration routine for determining the second diameter measurement that corresponds to the at least one contact point during the calibration routine for determining the first diameter measurement.

9. The method of claim 8, wherein the at least one contact point during the calibration routine for determining the first diameter measurement corresponds to at least an initial contact between the probe tip and the calibration piece during the calibration routine for determining the first diameter measurement and the at least one contact point during the calibration routine for determining the second diameter measurement corresponds to at least an initial contact between the probe tip and the calibration piece during the calibration routine for determining the second diameter measurement.

10. The method of claim 8, wherein the at least one contact point during the calibration routine for determining the first diameter measurement includes all contacts between the probe tip and the calibration piece during the calibration routine for determining the first diameter measurement and the at least one contact point during the calibration routine for determining the second diameter measurement includes all contact points between the probe tip and the calibration piece, during the calibration routine for determining the second diameter measurement, that correspond to contact points between the probe tip and the calibration piece during the calibration routine for determining the first diameter measurement.

11. The method of claim 8, wherein the calibration piece includes a spherical ball positioned in the measurement volume.

12. The method of claim 8, further comprising:
moving the calibration piece to additional calibration piece positions within the measurement volume, different from the first calibration piece position and the second calibration piece position;
determining additional diameter measurements of the probe tip by performing the calibration routine using the calibration piece with the calibration piece positioned at each of the additional calibration piece positions within the measurement volume; and
averaging the additional diameter measurements with the first diameter measurement and the second diameter measurement to determine the diameter of the probe tip.

13. A method of determining a diameter of a probe tip mounted via a probe shaft to an arm of a coordinate measuring machine, the arm being movable within a measurement volume of the coordinate measurement machine in each of an x-axis direction, a y-axis direction, and a z-axis direction, wherein the x-axis direction, the y-axis direction, and the z-axis direction are each orthogonal to one another, wherein movement of the arm along the x-axis direction is associated with a systematically varying x-axis position error, movement of the arm along the y-axis direction is associated with a systematically varying y-axis position error, and movement of the arm along the z-axis direction is associated with a systematically varying z-axis position error, the method comprising:
determining a first diameter measurement of the probe tip by performing a calibration routine using a calibration piece, wherein at least at one contact point during the calibration routine for determining the first diameter measurement, the arm is positioned at a first x-axis position associated with a first x-axis position error value, a first y-axis position associated with a first y-axis position error value, and a first z-axis position associated with a first z-axis position error value;
determining a second diameter measurement of the probe tip by performing the calibration routine using the calibration piece, wherein during the calibration routine for determining the second diameter measurement at least at one contact point that corresponds to the at least one contact point during the calibration routine for determining the first diameter measurement, the arm is positioned at a second x-axis position associated with a second x-axis position error value, a second y-axis position associated with a second y-axis position error, and a second z-axis position associated with a second z-axis position error, the second x-axis position error value, the second y-axis position error value, and the second z-axis position error value being different from the first x-axis position error value, the first y-axis position error value, and the first z-axis position error value, respectively; and
averaging the first diameter measurement and the second diameter measurement to determine the diameter of the probe tip.

14. The method of claim 13, wherein each of the second x-axis position, the second y-axis position, and the second z-axis position is different from the first x-axis position, the first y-axis position, and the first z-axis position, respectively, at the at least one contact point during the calibration routine for determining the second diameter measurement that corresponds to the at least one contact point during the calibration routine for determining the first diameter measurement.

15. The method of claim 14, wherein the at least one contact point during the calibration routine for determining the first diameter measurement corresponds to an initial contact between the probe tip and the calibration piece during the calibration routine for determining the first diameter measurement and the at least one contact point during the calibration routine for determining the second diameter measurement corresponds to an initial contact between the probe tip and the calibration piece during the calibration routine for determining the second diameter measurement.

16. The method of claim 14, wherein the at least one contact point during the calibration routine for determining the first diameter measurement includes all contacts between the probe tip and the calibration piece during the calibration routine for determining the first diameter measurement and the at least one contact point during the calibration routine for determining the second diameter measurement includes all contact points between the probe tip and the calibration piece during the calibration routine for determining the second diameter measurement that correspond to contact points between the probe tip and the calibration piece during the calibration routine for determining the first diameter measurement.

17. The method of claim 14, wherein the calibration piece includes a spherical ball positioned in the measurement volume.

18. The method of claim 14, further comprising:
determining additional diameter measurements of the probe tip by performing the calibration routine using the calibration piece with the arm positioned at each of additional x-axis positions associated with additional x-axis position error values, additional y-axis positions associated with additional y-axis position error values and additional z-axis positions associated with additional z-axis position error values; and averaging the additional diameter measurements with the first diameter measurement and the second diameter measurement to determine the diameter of the probe tip.

19. A method of determining a diameter of a probe tip mounted via a probe shaft to an arm of a coordinate measuring machine, the arm being movable within a measurement volume of the coordinate measurement machine in each of an x-axis direction, a y-axis direction, and a z-axis direction, wherein the x-axis direction, the y-axis direction, and the z-axis direction are each orthogonal to one another, the method comprising:

performing a calibration routine using a calibration piece, wherein a first set of contact points between the probe tip and the calibration piece is defined and a second set of contact points between the probe tip and the calibration piece is defined, a machine position associated with at least one contact point of the first set of contact points differing by at least one of an x-axis position along the x-axis direction, a y-axis position along the y-axis direction, and a z-axis position along the z-axis direction from a machine position associated with at least one contact point of the second set of contact points;

determining a first diameter measurement using the first set of contact points;

determining a second diameter measurement using the second set of contact points;

averaging the first diameter measurement and the second diameter measurement to determine the diameter of the probe tip.

20. The method of claim 19, wherein each contact of the first set is different from values of the second set.

21. The method of claim 19, wherein the first set and the second set include at least some contact points in common.

22. The method of claim 19, wherein the calibration piece includes a spherical ball positioned in the measurement volume.

23. The method of claim 19, wherein the first set and the second set each includes 13 contact points.

* * * * *